Figure 1:
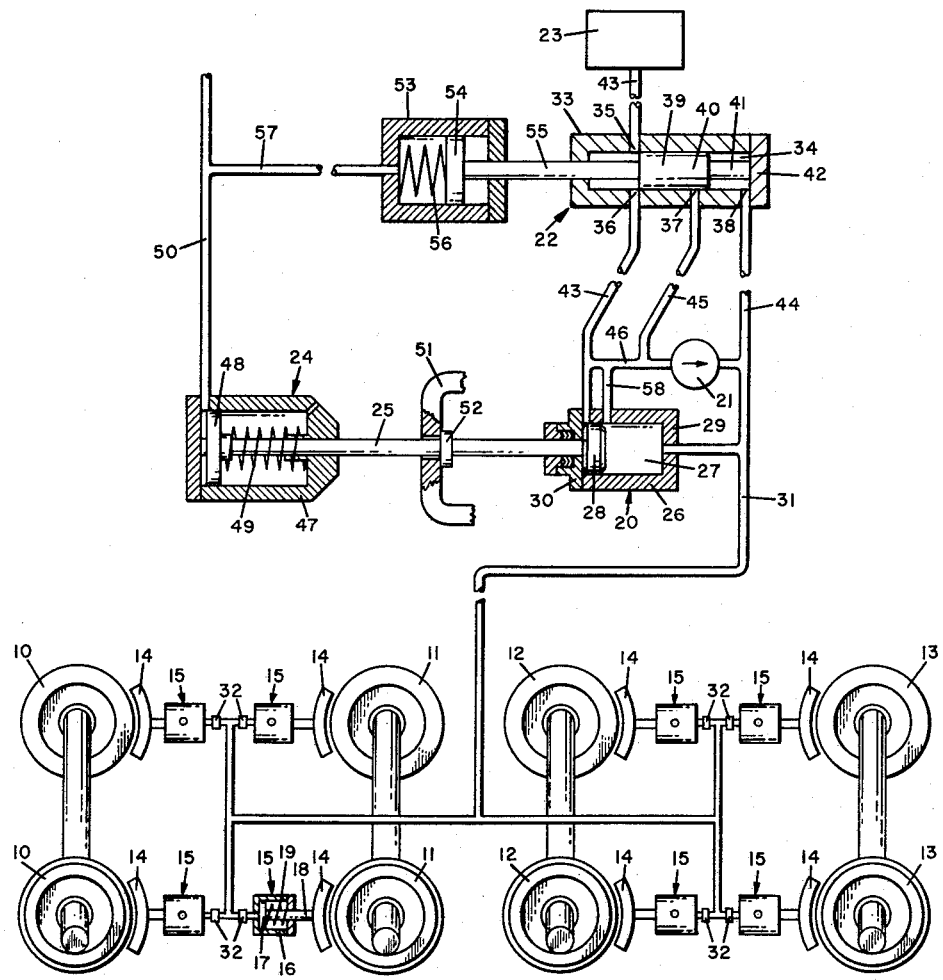

Nov. 21, 1961    H. B. HUNTRESS ET AL    3,009,324
FLUID PRESSURE OPERATED HYDRAULIC BRAKE APPARATUS
Filed Jan. 28, 1960

INVENTORS.
HOWARD B. HUNTRESS
THOMAS S. TAYLOR
BY Donald J. Dietrich

United States Patent Office 3,009,324
Patented Nov. 21, 1961

3,009,324
FLUID PRESSURE OPERATED HYDRAULIC
BRAKE APPARATUS
Howard B. Huntress and Thomas S. Taylor, Suffern,
N.Y., assignors to American Brake Shoe Company,
New York, N.Y., a corporation of Delaware
Filed Jan. 28, 1960, Ser. No. 5,136
6 Claims. (Cl. 60—54.6)

This invention relates to fluid pressure operated hydraulic brake operating apparatuses and one of its objects is to provide an improved apparatus which is particularly adapted for use in brake systems which are operated, for example, by a powered system, such as an air pressure or vacuum system, and which powered system may be under the control of a person, such brake systems being exemplified by the brake systems of railroad cars and trains.

In carrying out the foregoing object, it is a further object of the invention to provide an improved fluid pressure operated hydraulic brake operating apparatus which requires a minimum of maintenance nad servicing over prolonged periods of time and usage.

Another object of the invention is to provide an improved fluid pressure operated hydraulic brake cylinder which acts at times as a simple piston and cylinder hydraulic liquid displacing apparatus and at other times as a differential piston and cylinder hydraulic liquid displacing apparatus and in which hydraulic liquid under pressure in the cylinder thereof is positively prevented from leaking to the hydraulic liquid reservoir when the apparatus is functioning as a differential piston and cylinder by a pair of valves which are connected in series, and one of which valves is of a positive sealing type and may be a poppet valve.

Another object of the invention is to provide an improved fluid pressure operated hydraulic brake cylinder which operates as a simple piston and cylinder hydraulic liquid displacing apparatus to bring the friction brake elements of the brake system of which it forms a part into engagement quickly with a small amount of movement of its externally operated brake force applying means, and which, after said friction elements are brought into engagement, changes its mode of operation to that of a differential piston and cylinder thereby changing its liquid displacement ratio to apply braking force to the friction elements of the system.

Another object of the invention is to provide an improved fluid pressure operated hydraulic brake master cylinder as set forth in the foregoing object in which provision is made to insure that the master cylinder will not change its liquid displacement ratio due to surges in pressure in the brake system.

It is still another object of the invention to provide a fluid pressure operated hydraulic brake master cylinder or system of the differential piston type referred to in the foregoing object with improved pressure responsive valve means which operates in response to a predetermined pressure differential between the pressure of the fluid which operates it and the hydraulic pressure developed by the piston thereof which is employed to apply braking forces.

A still further object of the invention is to provide an improved fluid pressure operated hydraulic brake operating apparatus or system the valving means of which may be formed entirely of metal parts and which, therefore, are not subject to deterioration solely by reason of their age.

Further objects and advantages of the present invention will be apparent from the following description, reference being had to the accompanying drawings wherein a preferred form of embodiment of the invention is clearly shown.

Figure 2:
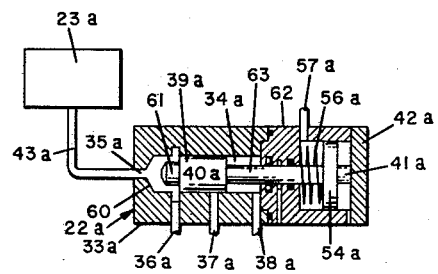

In the accompanying drawings:

FIG. 1 is a schematic view illustrating the invention as a fluid pressure operated hydraulic brake operating mechanism for a railroad car, the apparatus being shown in its normal, released or inoperative condition, and FIG. 2 is a a schematic view of a different control valve which may be substituted for the control valve shown in FIG. 1.

FIG. 1 of the drawings illustrates a hydraulic brake system which may be used with particular advantage on railroad cars, or other vehicles which, like railroad cars, are usually connected together and moved as a train and wherein there is a power system which operates the hydraulic system. The system illustrated includes four pairs of track engaging wheels 10, 11, 12 and 13. In practice each pair of these wheels is mounted upon a common axle and the axles and wheels are divided equally between two trucks, not shown, which carry the body of the railroad car. Each of the mentioned trucks carries four friction brake shoes 14 which are adapted to be pressed against the rims of the wheels by hydraulic motors 15 which motors are also carried by the truck.

The hydraulic motors 15 are of the piston and cylinder type and each includes a cylinder 16, a piston 17, a piston rod 18 which is operated by the piston 17 to move a brake shoe 14 and a spring 19 which surrounds the piston rod and engages the piston 17 and one end of the cylinder 16 to urge the brake shoe to its released position, i.e., away from the rim of its adjacent wheel.

The hydraulic brake system also includes a master cylinder which is comprised of a piston and cylinder assembly 20, a check valve 21, a differential fluid pressure operated control valve 22, a piston and cylinder type motor 53, 54. In practice the above-mentioned elements may be contained within a single body, but for the sake of simplicity they are herein shown as being separate structures interconnected by conduits.

The brake system also includes a reservoir 23 from which hydraulic brake liquid is supplied to the hydraulic system and an air operated operating piston and cylinder 24 by which the master cylinder is operated through a piston rod 25 to apply and release the brakes. It will be seen that the unit 24, if desired, may also be contained within the same body as the elements 20, 21 and 22.

The piston and cylinder assembly 20 includes a body or housing 26 which forms a cylinder 27 in which there is a piston 28 which may be formed integrally with the piston rod 25. The cylinder 27 is closed at one end by a wall 29 and its other end is closed by a cap 30 which includes a packing gland through which the piston rod 25 is reciprocated to move the piston 28. The end of the cylinder 27 adjacent the wall 29 is connected to a branched conduit 31 which is connected through fuse type valves 32 to the eight brake shoe operating motors 15.

The fuse type valves 32 are provided solely as a safety measure and each operates only if a hydraulic leak should occur in the motor 15 which receives hydraulic fluid through it to isolate that motor from the system so that the remainder of the system will remain operative. Valves of this type are well known in the art and for this reason the valves 32 will not be described further herein.

The control valve assembly 22 includes a body 33 the bore 34 of which is provided with a plurality of spaced ports 35, 36, 37 and 38 and in which there is a shuttle 39. The shuttle 39 includes a large diameter portion 40 which fits slidably but sealingly within the bore 34. The shuttle 39 is also provided with a reduced diameter stub portion 41 at one end thereof which cooperates with a cap 42 to form a stop which determines the position of the large diameter portion 40 of the shuttle 39 when the latter is urged to the right as shown in FIG. 1. The ports 35, 36, and 37 cooperate with the large diameter portion 40 of the shuttle 39 to form three valves, one at 35, 40, another at 36, 40 and the third at 37, 40.

The tank or reservoir 23 is connected with the rear, piston rod or small displacement area side of the piston 28 and cylinder 27 by the valves 35, 40 and 36, 40 which are interposed in series relation in a fluid passageway comprised of a conduit 43 between the reservoir 23 and valve 22. The large displacement area side of the piston 28 and cylinder 27 is interconnected with the small displacement area side thereof through a passageway forming means which includes a conduit 44 leading from the conduit 31 to the port 38 of valve 22, the bore 34 and port 37 and a conduit 45 which is connected to a conduit 46 which interconnects the conduits 43 and 44 in which the check valve 21 is interposed.

The power operated piston and cylinder 24 includes a body which forms a closed cylinder 47 in which there is a piston 48 that is attached to the operating or piston rod 25, a spring 49 surrounds the rod 25 and abuts one side of the piston 48 and one end of the cylinder 47 to urge the rod 25 and the piston 48 to the position seen in FIG. 1 of the drawings in which the brake system is inoperative and the brakes are released. A conduit 50 is connected to the cylinder 47 and air under pressure is admitted through this conduit 50 to the cylinder 47 from an accumulator, or pressure chamber, not shown, which is carried by the railroad car of which the brake system forms a part.

It may be mentioned here that in the brake system of a railroad train each car is provided with one of the mentioned accumulators and these accumulators are pressurized from a pump on the locomotive of the train and the accumulators are valved in such manner that when the engineer of the train reduces the air pressure in the system the accumulators are caused to direct air under pressure to a brake operating means such as the piston and cylinder assembly 24 described herein to apply the brakes on each car and consequently to the entire train. It may also be mentioned that each railroad car is provided with a manually operated means by which a brakeman riding the car may apply the brakes. This means usually comprises a hand operated winch mechanism, not shown, which is connected to move a yoke 51 that is carried by the rod 25 and is drawn against a collar 52 thereon to apply the brakes independently of the accumulator.

The apparatus also includes a cylinder 53 in which a piston 54 reciprocates. Piston 54 abuts a connecting rod 55 which extends through one end wall of the cylinder 53 and one end of the body 33 of the valve 22 and abuts one end of the shuttle 39. A resilient means in the form of a spring 56 which is contained within the cylinder 53 normally urges the piston 54, the operating rod 55 and the shuttle 39 to the right to the piston shown in FIG. 1 of the drawings and that end of the cylinder 53 in which the spring 56 is housed is connected to the conduit 50 by a conduit 57. The piston and cylinder assembly 53, 54 may also be contained within the same body as the elements 20, 21, etc.

In the operation of the system herein disclosed, when the engineer reduces the air pressure in the air or power operated portion of the brake system of the train, air under pressure from the mentioned accumulator is directed into the cylinder 47 to cause the piston 48, the rod 25 and piston 28 to move to the right from the positions in which they are shown in FIG. 1 of the drawings. Movement of the piston 28 to the right closes a compensating conduit or passageway 58, which is shown as being interposed between the large displacement area side of the piston 28 and the conduit 46, and the piston 28 then displaces fluid from the large displacement area side of the piston 28 and cylinder 27 to the conduits 31 and 44. At this time conduit 44 is blocked by the valve 37, 40 and check valve 21 and the fluid passes through the conduit 31 and the fuse valves 32 to the motors 15 which move the brake shoes 14 into engagement with the rims of the wheels 10–13.

It will be seen that the brake shoes will be moved rapidly into engagement with the wheels by a short stroke of the piston rod 25 and piston 28 since at this time the master cylinder is functioning as a simple fluid displacing apparatus and all of the fluid displaced from the large displacement area side of the piston 28 and cylinder 27 is directed to the motors 15 and the small displacement area side of the piston 28 and cylinder 27 is supplied with fluid from the reservoir 23 since they are in direct communication therewith through the conduit 43 and valves 35, 40 and 36, 40

After the brake shoes engage the wheels, the pressure at the large displacement area side of piston 28 will, of course, increase and this increasing pressure will be applied through the conduit 44 to the end area or surface of the shuttle 39 adjacent the cap 42. As this pressure increases the shuttle 39 will be moved to the left overcoming the force of the spring 56 and the air pressure in cylinder 53 and opening the valve 37, 40 and closing the valves 35, 40 and 36, 40 which valves, when closed, prevent the flow of fluid from the system to the reservoir 23 and vice versa. The relation of the valves is preferably such that valves 35, 40 and 36, 40 will have just closed when the valve 37, 40 cracks open.

At the time valve 37, 40 opens, the operation of the piston 28 and cylinder 27 changes from that of a simple fluid displacement type to a differential displacement type and this occurs because when valve 37, 40 is opened and valves 35, 40 and 36, 40 are closed, some fluid displaced from the large displacement area side of piston 28 is directed to the small displacement area side thereof through the conduit 44, valve 37, 40, and conduits 45, 46 and 43. When fluid is directed from the large to the small displacement area side of the piston in the manner described the volume of fluid displaced from the large displacement side of the piston which is effective for doing work is determined by the cross-sectional area of the piston rod 25.

From the description thus far given it will be seen that the friction elements, i.e., the brake shoes 14 and the rims of the wheels 10–13 will be brought into engagement quickly by a relatively short stroke of the piston 48, piston rod 25 and piston 28 and that after they become engaged the master cylinder will, in response to a build up to a predetermined pressure differential between the pressure of the fluid (air) which operates the apparatus and the pressure of the hydraulic liquid at the large displacement area end of its piston 28, change its mode of operation from that of a simple relatively large volumetric displacement device to that of a differential piston device having a smaller volumetric displacement and that the smaller volume displaced will then be employed to exert the brake applying force to the brake shoes.

When the brakes are to be released slowly the air is exhausted slowly from the cylinder 47 and spring 49 urges the piston 48, piston rod 25 and piston 28 back to the position seen in FIG. 1 thus reducing the hydraulic pressure at the large displacement area side of the piston 28 which, of course, permits the shuttle 39 to return to the position seen in FIG. 1 to close the valve 37, 40 to sever the communication between the large and small displacement area sides of the piston 28 and to open the valves 35, 40 and 36, 40 to re-establish communication between said small displacement area and the reservoir 23. If the piston 28 moves at a slow rate the fluid displaced back to the large displacement area side of it by the brake motors 15 will maintain the cylinder 27 at that side of said area full of liquid and after the piston 28 opens the compensating conduit 58 the hydraulic system will be opened to the reservoir 23.

When the brakes are released suddenly (by exhausting the air from the cylinder 47 quickly), the spring 49 may cause the piston 28 to be moved at a rate such that the brake motors 15 can not maintain the cylinder 27 at the large displacement area side of the piston 28 filled with fluid. Under this condition fluid may be drawn from the reservoir through the check valve 21 to supply the deficiency and after the piston 28 opens the compensating passage 58 any excess fluid then contained within the brake motors 15 will be returned to the reservoir 23.

The above described apparatus includes, among others, one feature which makes it particularly useful in connection with brake systems which are operated by a power system the latter of which may be under the control of a person, for example, the engineer of a railroad train, and this feature resides in the pressure differential operated control valve 22 and its function of preventing surges in pressure in the system from causing the master cylinder to change its mode of operation prematurely from that of a simple displacement piston and cylinder to that of a differential displacement piston and cylinder.

In brake systems of the type referred to it frequently occurs that the power system which operates the hydraulic system is actuated quickly and in the absence of the precautionary feature above referred to the surge in pressure at the large displacement area side of the piston 28 could be reflected to the valve 22 to cause the shuttle 39 thereof to shift and change the mode of operation of the master cylinder from the simple piston and cylinder displacement type to the differential piston and cylinder displacement type before the brake shoes are brought into engagement with the rims of the wheels. Such action is, of course, highly undesirable and it is prevented in the apparatus described by the pressure differential operated control valve 22.

It will be seen that in the present system the air pressure acting upon the piston 54 and the spring 56 urge the shuttle 39 in one direction, namely to the right as seen in FIG. 1 of the drawings, and that the pressure of the hydraulic fluid applied to the motors 15 is also applied to the end of the shuttle to oppose the forces of the air and spring. For this reason, the valve 22 will not shift to change the mode of operation of the master cylinder due to surges in pressure in the system which effect the air and hydraulic pressures proportionally.

It will be apparent to those skilled in the art that the relative diameters of the pistons 48 and 28 as well as those of the pistons 54 and 39 may be adjusted as desired to provide, in the first instance, the desired multiplication of brake applying forces, and in the second instance, the desired pressure differential between the air and hydraulic pressures at which the valve 22 will shift.

FIG. 2 of the drawings illustrates a modified form 22a of the pressure differential operated valve 22 which may be substituted for the latter in the system seen in FIG. 1 of the drawings. This valve 22a includes a body portion 33a, the bore 34a of which is provided with a plurality of spaced ports 36a, 37a and 38a in its side wall and a port 35a in its end wall, the latter opening into the bore through a valve seat 60. The bore 34a also contains a shuttle 39a which includes a large diameter portion 40a which fits slidably but sealingly within the bore 34a. This shuttle 39a also includes a reduced diameter stub portion 61 which is tapered at its end to form a poppet valve element which engages the seat 60 to form a valve. The end of the body 33a opposite the valve seat 60 is closed by a second body element 62 which includes a stepped bore 59 having a large and a small diameter portion. A piston rod 63 extends from the portion 40a of the shuttle through the small diameter bore in body element 62 and the end thereof is attached to a piston 54a which operates in the large diameter portion of the bore. A spring 56a urges the shuttle 39a and piston 54a to the position shown in FIG. 2 of the drawings in which a stop element 41a engages a cap 42a of the valve assembly 22a. A port 57a enters the large diameter portion of the bore 59 between the piston 54a and the end wall of the bore 59 adjacent the small diameter bore.

When the valve assembly 22a shown in FIG. 2 of the drawings is substituted in the circuit or system of FIG. 1 for the valve 22 thereof, its port 35a is connected through a conduit 43a to a fluid reservoir 23a, its port 36a is connected to that portion of the conduit 43 which leads to the master cylinder and its ports 37a, 38a and 57a are connected respectively to conduits 45, 44 and 57. The operation of valve assembly 22a is identical to that of valve assembly 22, but this valve 22a provides a poppet type valve 60, 61 as well as a spool and port valve 37a, 40a between the master cylinder and the reservoir.

From the foregoing description it is obvious that by this invention there has been provided a power operated hydraulic brake operating apparatus which is compatible with the brake systems presently employed on railroad cars and that any car employing the invention may be placed in a train among other cars which do not include it.

It will also be seen that a railroad car brake system including our invention has the advantage over existing air operated brake systems in that it will operate upon smaller volumes of air and this is because the master cylinder first functions as a motion multiplier and requires only a small amount of movement of the air motor piston which operates it to bring the brake shoes into engagement with the wheels.

It will be obvious that because the brake shoes are moved initially through a greater distance or stroke with a relatively short travel of the piston of the air operating motor and the piston of the master cylinder that the brake shoes can be worn from their new condition to their worn out condition without requiring that the brake systems be serviced to adjust the slack in its linkage to maintain the brake shoes close to but out of engagement with the wheels.

While the form of embodiment of the present invention as herein disclosed constitutes a preferred form, it is to be understood that other forms might be adopted, all coming within the scope of the claims which follow.

We claim:

1. In a fluid pressure operated hydraulic brake operating apparatus, a cylinder; a piston in said cylinder having a large and a small displacement area, one on each side thereof; motor means operated by fluid pressure from an independent source for moving said piston in said cylinder to create hydraulic brake operating pressure at the large displacement side thereof; differential pressure operated valve means connected between the opposite ends of said cylinder and said large and small piston displacement areas; resilient means normally maintaining said differential pressure operated valve means closed whereby communication between said opposite ends of said cylinder and said large and small piston displacement areas is normally prevented; pressure responsive means for opening said differential pressure operated valve means, said pressure responsive means including means exposed to said hydraulic brake operating pressure at the large displacement side of said piston, and another means exposed to the pressure of said brake operating fluid from said independent source and opposing the opening operation of said differential pressure operated valve means by the pressure from said large displacement side of said piston.

2. In a fluid pressure operated hydraulic brake operating apparatus, a cylinder; a piston in said cylinder having a large and a small displacement area, one on each side thereof; motor means operated by fluid pressure from an independent source for moving said piston in said cylinder to create hydraulic brake operating pressure at the large displacement side thereof; supply conduit means by which hydraulic liquid may be supplied to said cylinder; connecting conduit means connecting the opposite ends of said cylinder and said large and small piston displacement areas; normally open valve means in said supply conduit means; normally closed valve means in said connecting conduit means; spring means normally maintaining said normally open valve means open and said normally closed valve means closed; differential pressure responsive means for closing said normally open valve means and opening said normally closed valve means, said differential pressure responsive means being exposed to the pressure of said hydraulic brake operating liquid, and another means exposed to the pressure of said fluid from said independent source opposing the described operation of said valve means, said pressure responsive means operating said valve means as described as a result of a predetermined increase in the forces of said hydraulic liquid acting upon said differential pressure responsive means over the forces of said fluid from said independent source acting thereon in opposition to said hydraulic liquid forces.

3. In a fluid pressure operated hydraulic brake operating apparatus, a cylinder; a piston in said cylinder having a large and a small displacement area, one on each side thereof; motor means operated by fluid pressure from an independent source for moving said piston in said cylinder to create hydraulic brake operating pressure at large displacement side thereof; supply conduit means by which hydraulic liquid may be supplied to said cylinder; connecting conduit means connecting the opposite ends of said cylinder and said large and small piston displacement areas; normally open valve means in said supply conduit means including a pair of valves connected in series; normally closed valve means in said connecting conduit means; spring means normally maintaining said normally open pair of valve means open and said normally closed valve means closed; operating means for closing said normally open pair of valve means and opening said normally closed valve means, said normally open valve means closing substantially simultaneously with opening of said normally closed valve means, said operating means being exposed to the pressure of said hydraulic brake operating liquid, and another means exposed to the pressure of said fluid from said independent source opposing the described operation of said valve means, said pressure responsive means operating said valve means as described as a result of a predetermined increase in the forces of said hydraulic liquid acting upon said differential pressure responsive means over the forces of said fluid from said independent source acting thereon in opposition to said hydraulic liquid forces.

4. In a fluid pressure operated hydraulic brake operating apparatus, a cylinder; a piston in said cylinder having a large and a small displacement area, one on each side thereof; motor means operated by fluid pressure from an independent source for moving said piston in said cylinder to create hydraulic brake operating pressure at the large displacement side thereof; differential pressure operated valve means connected between opposite ends of said cylinder and said large and small piston displacement areas, said valve means including a cylinder having spaced ports for establishing communication between said opposite ends of said cylinder and said large and small piston displacement areas; a shuttle in said cylinder; spring means normally maintaining said shuttle in a position to prevent communication between said opposite ends of said cylinder and said large and small piston displacement areas; means exposed to said hydraulic brake operating pressure at the large displacement side of said piston for moving said shuttle to open said communication, and another means exposed to the pressure of said brake operating fluid from said independent source opposing the opening operation of said valve means, said shuttle operating to prevent communication between said opposite ends of said cylinder and said large and small piston displacement areas upon a predetermined increase in the forces of said hydraulic liquid acting to operate said shuttle over the forces of said fluid from said independent source acting in opposition thereto.

5. In a fluid pressure operated hydraulic brake operating apparatus, a cylinder; a piston in said cylinder having a large and a small displacement area, one on each side thereof; motor means operated by fluid pressure from an independent source for moving said piston in said cylinder to create hydraulic brake operating pressure at the large displacement side thereof; differential pressure operated valve means including a body having a bore with spaced ports therein; a supply conduit connected between one of said ports and said cylinder through which liquid may be supplied to said cylinder; conduit means connecting the opposite ends of said cylinder and said large and small piston displacement areas through another of said ports; shuttle means in said bore cooperating with said ports to form a pair of valves; means normally maintaining said shuttle in a position wherein said first mentioned port is open and said second mentioned port is closed; operating means for moving said shuttle to close said first mentioned port and to open said second mentioned port, said operating means including an area on one end of said shuttle exposed to said hydraulic brake liquid operating pressure, and pressure responsive means exposed to the pressure of the fluid from said independent source opposing the force which causes the described operation of said shuttle, said shuttle operating as described to close said first mentioned port and open said second mentioned port in response to a predetermined increase in the forces of said hydraulic liquid acting upon said shuttle over the forces of said fluid from said independent source acting thereon in opposition to said hydraulic liquid forces.

6. In a fluid pressure operated hydraulic brake operating apparatus, a cylinder; a piston in said cylinder having a large and a small displacement area, one on each side thereof; motor means operated by fluid pressure from an independent source for moving said piston in said cylinder to create hydraulic brake operating pressure at the large displacement side thereof; differential pressure operated valve means including a body having a bore; a valve seat at one end of said bore and spaced ports in the walls of said bore; a supply conduit connected through said seat and one of said ports with said cylinder through which hydraulic liquid may be supplied to said cylinder; conduit means connecting the opposite ends of said cylinder and said large and small piston displacement areas through another of said ports; shuttle means in said bore; valve means at one end of said shuttle means for closing said seat, said shuttle means cooperating with said ports to form a pair of valves; means normally maintaining said shuttle means in a position wherein said seat and said first mentioned port are open and the second mentioned port is closed; operating means for moving said shuttle to close said seat and said first mentioned port and to open said second mentioned port, said operating means including an area on one end of said shuttle means exposed to said hydraulic brake liquid operating pressure, and another pressure responsive means exposed to the pressure of said fluid from said independent source opposing the force which causes the described operation of said shuttle means, said shuttle operating to close said first mentioned port and said seat and to open said second mentioned port in response to a predetermined increase in the forces of said hydraulic liquid acting upon said shuttle over the forces of said fluid from said independent source acting thereon in opposition to said hydraulic liquid forces.

References Cited in the file of this patent
UNITED STATES PATENTS 2,875,582    Hill _____ Mar. 3, 1959

FOREIGN PATENTS 1,125,359    France _____ July 9, 1956